United States Patent [19]

Minck et al.

[11] 3,811,943

[45] May 21, 1974

[54] MASS TRANSPORTATION ELECTRODE FOR ENERGY CONVERSION DEVICE

[75] Inventors: Robert W. Minck, Lathrup Village; Ragnar P. Tischer, Troy, both of Mich.

[73] Assignee: Ford Motor Company, Dearborn, Mich.

[22] Filed: Feb. 16, 1971

[21] Appl. No.: 115,455

[52] U.S. Cl. ............................. 136/6 FS, 136/83 R
[51] Int. Cl. .......................................... H01m 35/00
[58] Field of Search ............ 136/6, 83 R, 3, 86, 153

[56] References Cited
UNITED STATES PATENTS

| | | | |
|---|---|---|---|
| 3,468,709 | 9/1969 | Kummer ................................ 136/6 |
| 3,413,150 | 11/1968 | Kummer et al. ......................... 136/6 |
| 3,393,097 | 7/1968 | Robinson et al. ....................... 136/83 |
| 3,174,880 | 3/1965 | Buitkus ................................ 136/83 |
| 3,404,035 | 10/1968 | Kummer et al. ......................... 136/6 |
| 3,446,677 | 5/1969 | Tennenhouse ......................... 136/153 |
| 3,475,223 | 10/1969 | Kummer et al. ........................ 136/86 |
| 3,476,602 | 11/1969 | Brown et al. ............................ 136/6 |

Primary Examiner—Anthony Skapars
Attorney, Agent, or Firm—William E. Johnson; Glenn S. Arendsen; Keith L. Zerschling

[57] ABSTRACT

An electronically conductive perforated metal sheet contacts the exterior of a thin layer of graphite felt that has its interior in contact with the polysulfide side of the solid electrolyte in a sodium-sulfur energy conversion device. The perforated metal sheet is spaced away from the container wall to define an open space of considerable volume and is connected to an exterior terminal. Reactants and reaction products mix readily in the open space and flow easily through the perforations in the metal sheet to exchange electrons with the graphite felt.

12 Claims, 11 Drawing Figures

PATENTED MAY 21 1974　　　3,811,943
SHEET 1 OF 2
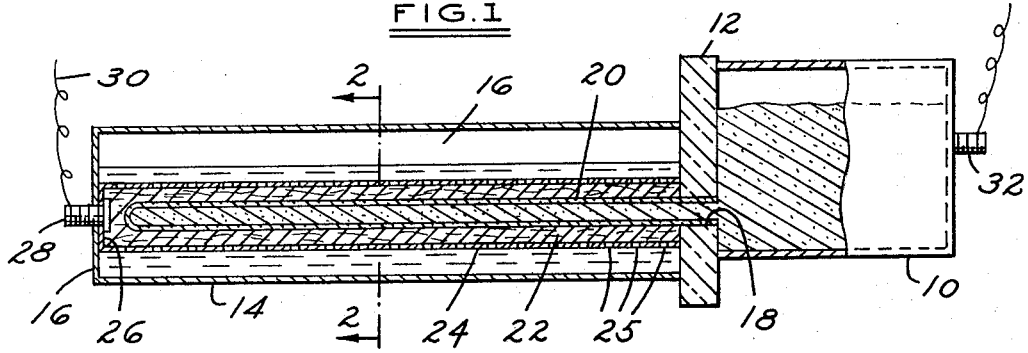
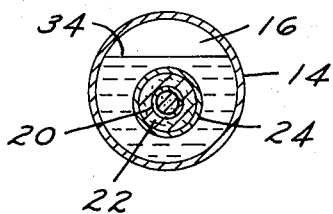
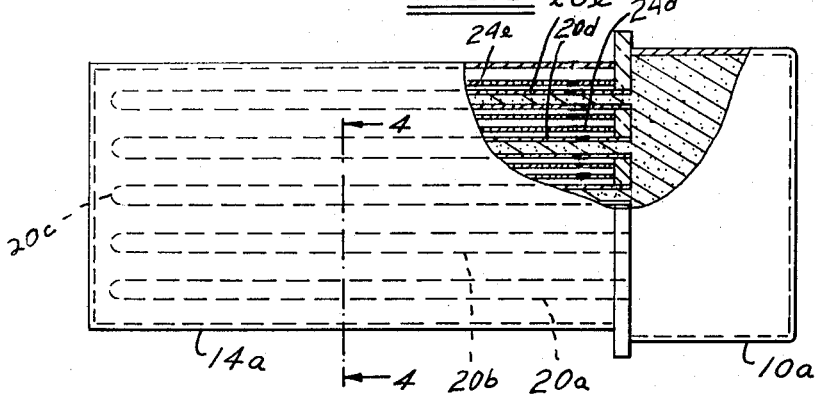
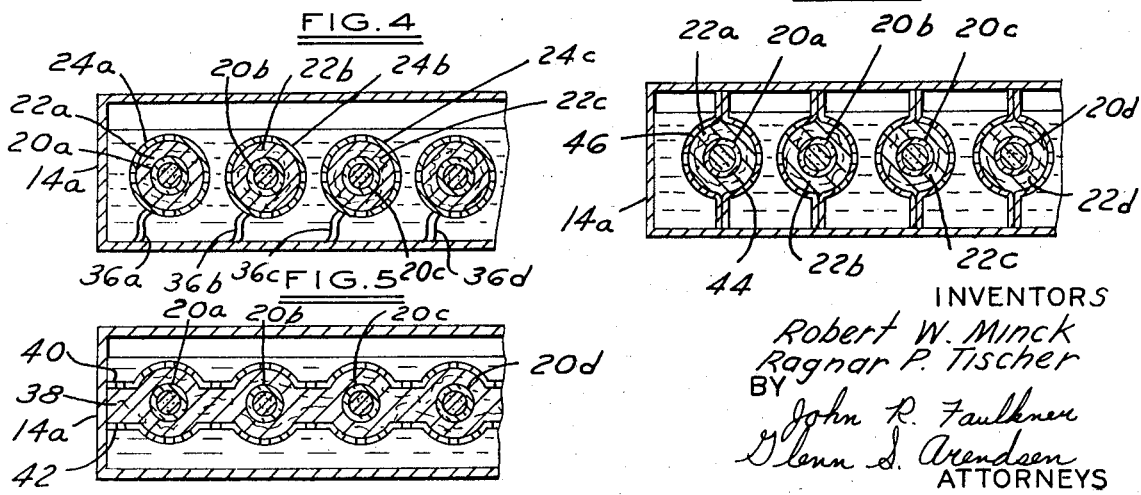
INVENTORS
Robert W. Minck
Ragnar P. Tischer
BY
John R. Faulkner
Glenn S. Arendsen
ATTORNEYS

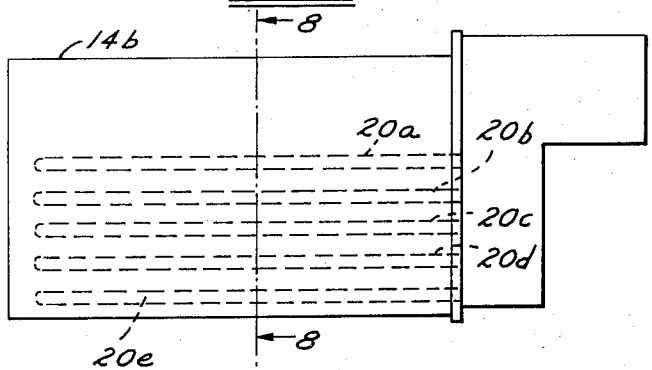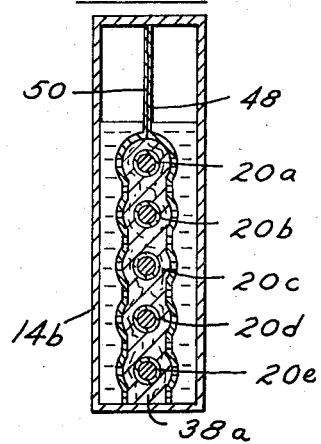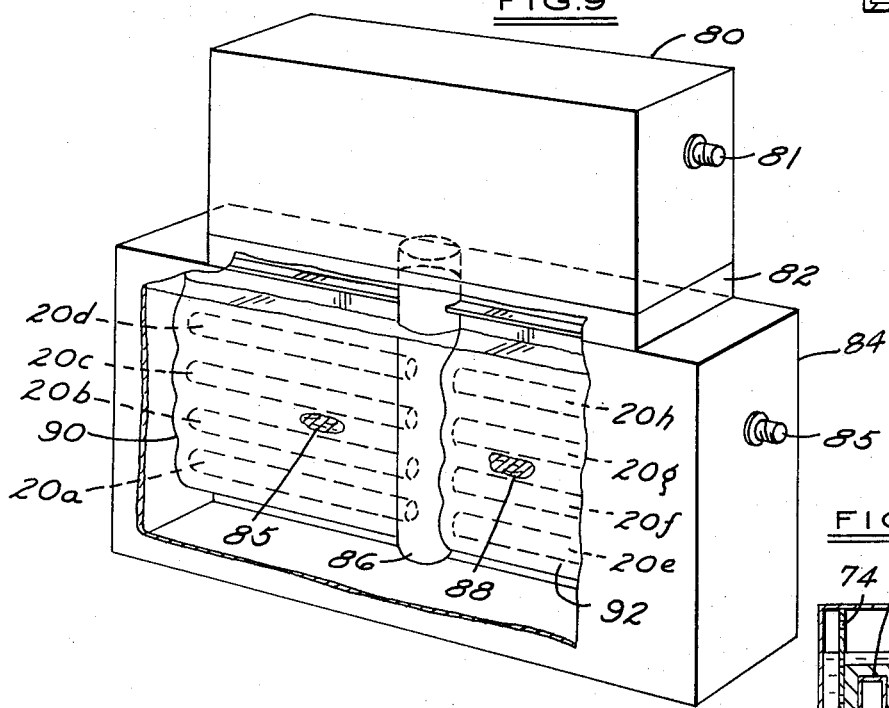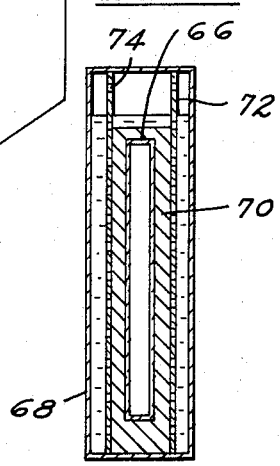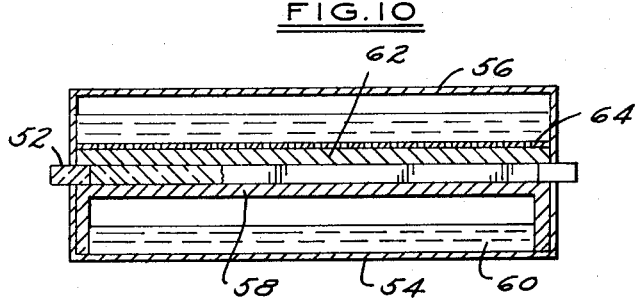

MASS TRANSPORTATION ELECTRODE FOR ENERGY CONVERSION DEVICE

SUMMARY OF THE INVENTION

In the recently developed sodium-sulfur energy conversion devices, sodium ions migrate through a solid electrolyte that has molten sodium on one side and molten sulfur or a mixture of molten sulfur and sodium polysulfide on the other side. During the discharging cycle of a battery exemplifying the devices, sodium atoms surrender an electron to an external circuit and the resulting sodium ions pass through the solid electrolyte to unite with sulfur ions formed with electrons from the external circuit. Both electrons and molten sulfur reactant must be supplied to and distributed along the surface of the solid electrolyte. The opposite procedure occurs during the charging cycle.

An electrode structure located at the surface of the solid electrolyte supplies and distributes electrons. Sulfur reactant must move readily into and out of the vicinity of the electrode structure and solid electrolyte surface, which is difficult because the reactants and reaction products are only slightly miscible and the electrode structure inhibits mass flow thereof. Additionally, maximum reactants and reaction products can be maintained in contact with the maximum surface area of the solid electrolyte despite volume changes caused by ion migration. Similar mass transfer and changing volume considerations have been encountered in other energy conversion devices involving relatively nonconducting reaction products such as selenium and other inorganic and organic liquids.

This invention provides an energy conversion device having greatly improved mass transportation of the reactants and reaction products to and from the vicinity of the solid electrolyte and electrode. The invention also provides maximum utilization of the area of the solid electrolyte and electrode despite the volume changes of the reactants. In the device, an ionically conductive electrolyte is located between a first reactant in one container and a second reactant in another container (the term reactant is used herein to designate both reactants and reaction products). An electrode for one of the reactants comprises a layer of electronically conductive material having one surface in contact with one side of the ionically conductive electrolyte. The other surface of the material is in contact with a structurally integral, electronically conductive member permeable to mass flow of its reactant and electrically connected to the external circuit. An open volume exists between the structurally integral conductive member and the container wall to promote free flow and mixing of the reactant. Reactant also flows readily through the conductive member into the layer of the electronically conductive material. The conductive member distributes electrons to the conductive material which in turn transfers the electrons to or from the reactants.

The invention is useful particularly with ionically conductive solid electrolytes such as those disclosed in U.S. Pat. Nos. 3,404,035; 3,404,036; 3,446,677; 3,475,225 and 3,535,163. Briefly, such solid electrolytes comprise a solid mixture of aluminum oxide and an alkali metal oxide that conducts alkali metal ions when under the influence of an electrical field. Small amounts of magnesium oxide or lithium oxide can be added to improve properties. The mobile alkali metal ions can be sodium, potassium, etc. Glass type solid electrolytes or other appropriate inorganic or organic solid electrolytes compatible with the reactants also can be used. The invention also can be used with ionically conductive, immobilized liquid electrolytes such as those used in prior art lithium-sulfur batteries.

Good efficiency without interference from volume changes of the reactants is achieved in sodium-sulfur energy conversion devices by making solid electrolyte in the form of a cylindrical tube closed at one end. The tube is disposed horizontally in a container for the sulfur and its open end communicates with a sodium reservoir that supplies sodium to the tube interior. The conductive material surrounds the tube exterior and the conductive member surrounds the material. Sulfur reactant fills the sulfur container to just submerge the highest point of the conductive member at its minimum volume and fill the entire container at its maximum volume.

The tube also can be disposed vertically if desired. Horizontal rows or vertical columns of a plurality of tubes also can be used. Sulfur reactant along with the conductive material and the conductive member can be positioned on the interior of the tube or tubes. Planar shapes of the solid electrolyte also can be used.

The energy conversion device can be a primary battery, a secondary battery, a fuel cell, a thermally regenerated battery or a cell used in converting an alkali metal salt into elemental alkali metal. Examples of such devices can be found in the aforementioned U.S. patents.

A thin layer of graphite felt serves effectively as the electronically conductive material. Such felts preferably have a density of about 0.1 grams per cubic centimeter. Layer thickness preferably is consistent with the desired current density and utilization of active materials; for most purposes, the layer is less than about 2 millimeters thick. Other electronically conductive fibrous materials capable of surviving for useful time periods in the reactant, such as stainless steel felts, also can be used.

A perforated stainless steel sheet serves effectively as the structurally integral conductive member. Chromium nickel alloys and other metals capable of surviving for useful periods also can be used. Size, shape and number of the perforations is selected as a compromise between improved mass transfer characteristics and good electrical contact to the graphite felt layer. Slot shaped perforations demonstrate an improved combination of these properties. Perforations providing about 50 percent of open area and having a minimum open dimension of about 1 millimeter greatly improve operational characteristics. Expanded metal sheet or wire mesh can be used as the conductive member. Electrical leads or other techniques are used to connect the mesh to an exterior terminal for the external circuit.

BRIEF DESCRIPTION OF THE DRAWINGS

FIG. 1 is a sectioned elevation of a sodium-sulfur energy conversion device having a horizontally disposed tubular solid electrolyte with the conductive material and the conductive member on its exterior.

FIG. 2 is a sectional view taken along line 2—2 of FIG. 1.

FIG. 3 is a partially sectioned plan view of an energy conversion device having a plurality of horizontally adjacent electrode constructions using tubular solid electrolytes within a single housing.

FIG. 4 is a partial sectional view taken along line 4—4 of FIG. 3 to show the individual nature of each electrode construction.

FIG. 5 illustrates an alternate arrangement of the construction shown in FIGS. 3 and 4 in which two unitary pieces of the conductive member are placed respectively above and below a unitary piece of conductive material that surrounds all of the solid electrolyte tubes. The conductive members are attached to a container side wall.

FIG. 6 shows an alternate to the FIG. 5 construction in which conductive members individually surround each solid electrolyte tube and connect with the floor and/or roof of the container.

FIGS. 7 and 8 show a vertically stacked arrangement of horizontal solid electrolyte tubes in which vertically disposed conductive members surround all tubes and attach to the floor and/or roof of the container.

FIG. 9 is a partially sectioned elevation of a construction having a centrally located distributing manifold supplying sodium to two stacked arrangements of tubes.

FIG. 10 is a sectioned elevation of a construction in which the separator is a horizontally disposed plate having sodium on its lower side and sulfur reactant on its upper side.

FIG. 11 is a sectioned elevation of a construction in which the separator is a hollow, vertically disposed plate having sodium inside the plate and sulfur reactant outside.

DETAILED DESCRIPTION

Referring to FIGS. 1 and 2, the energy conversion device comprises an electronically conductive cylindrical container 10 closed at one end and having its other end sealingly attached to one side of an insulating plate 12 made of alpha alumina. A second electronically conductive cylindrical container 14 having one closed end 16 has its other end sealed to the opposite side of plate 12. Container 10 is made of stainless steel, nickel-iron cobalt alloys or other materials resistant to molten sodium. Container 14 is made of stainless steel or other materials resistant to molten sulfur. Container 14 is mounted so that its axis is slightly below that of container 10.

A hole 18 extends through plate 12 slightly below the axis of container 14 and the open end of a solid electrolyte tube 20 extends through hole 18 so the tube interior communicates with the interior of container 10. Tube 20 is sealed to plate 12. The other end of tube 20 is closed as shown and it terminates a short distance away from the closed end 16 of container 14.

A layer 22 of graphite felt surrounds the entire exterior of tube 20. Layer 22 generally is about 2 millimeters thick and its thickness has been exaggerated in the drawings for illustration. The graphite felt typically has a density of about 0.1 gram per cubic centimeter and its interior surface is in intimate contact with the exterior of electrolyte tube 20.

A perforated stainless steel cylinder 24 contacts intimately the exterior surface of graphite felt layer 22. Cylinder 24 extends the entire length of container 14 and has small inwardly projecting tabs 26 at its left end that bear against closed end 16. The cylinder has a plurality of small perforations 25 therein. Each perforation has a diameter of about 2 millimeters and sufficient perforations are present to make up about 50 percent of the surface area of the cylinder. A threaded fastener 28 having a relatively flat head extends through end wall 16 from the inner side with its head clamping tabs 26 against the end wall to produce electronic contact. To ease thermal stresses, cylinder 24 is not attached rigidly to plate 12; a shallow, circular slot can be formed in plate 12 to receive loosely the end of the cylinder if desired. An external circuit 30 connects fastener 28 with a similar fastener 32 located in the end wall of container 10.

Sufficient molten sodium is placed in container 10 to fill the interior of tube 20 during all phases of operation. Molten sulfur or a mixture of sulfur and sodium polysulfide fills container 14 to a level 34 that just submerges the upper portion of cylinder 24. A considerable space exists between the walls of container 14 and cylinder 24 as shown in FIG. 2.

During cell operation, sodium atoms in container 10 surrender electrons to the external circuit and the resulting sodium ions pass through the walls of tube 20 into the volume occupied by graphite felt 22. The electrons flow through the external circuit and fastener 28 to cylinder 24 which transmits the electrons along its length and distributes them to felt layer 22. Layer 22 conducts the electrons toward the outer surface of tube 20 where the electrons convert sulfur atoms into sulfur ions that react with sodium ions emerging from tube 20 to form sodium polysulfide. The sodium polysulfide moves outward through perforations 25 and into the open space between cylinder 24 and container 14 while sulfur moves from the open space through the perforations and into the area of the graphite felt. Despite the increasing volume of reactant in container 14, the cell continues to operate at a high degree of efficiency since cylinder 24 is always submerged in the reactant. The opposite reactions and procedures occur during reverse cell operation.

Turning to FIGS. 3 and 4, five individual solid electrolyte tubes 20a, 20b, 20c, 20d and 20e are disposed horizontally in a container 14a (tube 20e is not shown in FIG. 4). The tubes are spaced horizontally from each other and the interior of each tube communicates with the interior of container 10a. Each tube is surrounded by a thin layer of graphite felt 22a–e and each felt layer is surrounded in turn by a perforated stainless steel cylinder 24a–e. Cylinders 24a–e can be connected to container 14a and an external terminal (not shown) in the manner shown in FIG. 1 or by the individual leads 36a–e shown in FIG. 4. Operation of the constructions shown in FIGS. 3 and 4 is similar to that of FIG. 1.

In FIG. 5, a unitary piece 38 of the graphite felt surrounds each tube 20a–d (tube 20e is not shown). An upper perforated member 40 is located on top of the graphite felt and a lower perforated member 42 is located below the graphite felt. Members 40 and 42 have a trough construction as shown to conform to the shapes of the felt covered tubes. The ends of members 40 and 42 are welded or otherwise electronically connected to at least one side wall of container 14a.

FIG. 6 construction is similar to that of FIG. 4 except that each layer of graphite felt is surrounded by two vertically arranged, trough shaped, perforated members 44 and 46. Members 44 and 46 are brought together above and below the graphite felt layers and are welded to the roof and/or the floor of container wall 14a. Operation of the FIGS. 5 and 6 constructions is similar to that of FIG. 1.

The vertical construction of FIGS. 7 and 8 has a plurality of horizontally disposed solid electrolyte tubes 20a–e stacked vertically above each other with the highest being a substantial distance from the roof of container 14b. A unitary piece 38a of graphite felt surrounds each tube as shown in FIG. 8. Two vertically arranged perforated members 48 and 50 have appropriate troughs that fit around the felt covered tubes. Above the highest tube, members 48 and 50 come together and are electronically connected to the roof of the container. The lower edges of members 48 and 50 rest on the floor of the container. Reactant fills container 14b to a level sufficient to submerge the highest points of the troughs of members 48 and 50 that surround the highest tube when the cell is fully charged. The remaining distance to the roof is sufficient to handle the increased volume of the sulfur reactant during discharging.

FIG. 10 shows a construction in which a solid electrolyte plate 52 is disposed between a lower container 54 and an upper container 56. A U-shaped member 58 made of a porous metal has its base bearing against the lower surface of plate 52 and its legs depending downwardly therefrom. Container 54 is filled to a predetermined level with molten sodium 60 and metal member 58 utilizes capillary action to draw the molten sodium into contact with the lower surface of plate 52.

A thin layer 62 of the graphite felt covers the upper surface of plate 52. Layer 62 in turn is covered by a sheet 64 of perforated metal. Container 56 is filled with molten sulfur or a mixture of sulfur and sodium polysulfide to a predetermined level that reserves space for volume changes. Cell operation occurs in a manner similar to that of the cells previously described.

In FIG. 11, the solid electrolyte is formed in the shape of a hollow plate 66 disposed within a housing 68. The hollow interior of plate 66 is filled with molten sodium and communicates with an elevated sodium reservoir (not shown). A layer 70 of the graphite felt is applied to the exterior surfaces of plate 66 and the graphite felt is held in place by sheets 72 and 74 of perforated metal. The ends of sheets 72 and 74 are welded to the floor and/or roof of container 68. Container 68 is filled with sulfur reactant to a level just above the top of plate 66 when the cell is fully charged. The walls of container 54 and 56 in FIG. 10 and container 68 in FIG. 11 can be designed to deflect according to the volume of contained reactant so that the containers always are full. Similar considerations can be applied to the other cells.

FIG. 9 cell construction is similar to FIG. 7 construction but offers several advantageous features. A sodium container 80 rests on an insulating pad 82 that in turn rests on a container 84 for the sulfur reactant. Containers 80 and 84 typically are stainless steel. Pad 82 is made of alpha alumina, asbestos, or a variety of electrically insulating materials capable of surviving for useful periods at operating temperatures. Appropriate studs 81 and 85 provide for connection to the external circuit.

A distributing tube 86 that is closed at its lower end has its open upper end extending into the interior of container 80. Tube 86 is made of nonconducting material such as alpha alumina and its upper end has an active metal braze connecting it to container 80. A glass or high temperature polymer seals tube 86 to the roof of container 84.

Four horizontally disposed solid electrolyte tubes 20a, 20b, 20c, and 20d are stacked vertically on one side of tube 86. Tubes 20a–d extend sealingly through the wall of tube 86 and communicate with the interior thereof. In a similar manner, four tubes 20e, 20f, 20g and 20h are stacked vertically on the opposite side of tube 86 and extend sealingly through its wall to comunicate with its interior.

Unitary pieces of graphite felt 85 and 88 surround each respective stack of tubes in the manner shown in FIG. 8 except that the felt curves around the bottom tubes rather than extending to the container floor. A U-shaped piece of perforated sheet 90 is attached to the roof of container 84 and extends downward on each side of felt 85. Sheet 90 contains appropriate troughs that fit around the felt. A similar sheet 92 surrounds felt covered tubes 20e–h.

Container 84 is filled with molten sulfur to a level just above tubes 20d and 20h and container 80 is filled to an appropriate level with molten sodium. The molten sodium fills tube 86 and solid electrolyte tubes 20a–h. Cell operation occurs in the manner described above. The cell makes efficient use of its volume, is relatively easy to construct and seal, and has a double wall construction separating most of the sodium from most of the sulfur reactant.

Secondary batteries constructed according to this invention have demonstrated 90 percent rechargeability under conditions similar to those in which prior art batteries having the sulfur container filled with graphite felt showed 20 percent rechargeability. The invention is particularly useful in large energy conversion devices where large increases in cell capacity per unit area of solid electrolyte are achieved.

We claim:

1. In an energy conversion device having an ionically conductive electrolyte between a first fluid reactant located in one container and a second reactant located in another container, an electrode for said fluid reactant comprising:

a layer of fibrous, electronically conductive material having one surface in contact with one side of said ionically conductive electrolyte, a structurally integral, electronically conductive member in physical and electrical contact with said layer, said member containing openings therein that have a minimum dimension of about 1 millimeter to permit mass flow through said openings of the reactant in contact with said conductive member, and means electrically connecting said structural integral conductive member to an external circuit, said conductive member distributing electrons to said conductive material and said conductive material transferring electrons to the reactant in contact therewith.

2. The device of claim 1 in which the electronically conductive member is spaced away from the container for its reactant.

3. The device of claim 2 in which the electronically conductive material is a thin layer of graphite felt.

4. The device of claim 3 in which the conductive member is a metal sheet having a plurality of openings therein.

5. The device of claim 4 in which the ionically conductive electrolyte is a tube having one reactant in contact with its interior and the other reactant in contact with its exterior, said conductive material and said conductive member being on the exterior of said tube.

6. The device of claim 5 comprising a plurality of said electrolyte tubes spaced apart from each other in the container for said reactant, said conductive material surrounding each of said tubes and connecting with the conductive material surrounding adjacent tubes, said conductive member contacting the exterior of said conductive material that is exposed to the second reactant.

7. The device of claim 6 in which the conductive material and the conductive member are in physical and electrical contact with the container for the second reactant.

8. The device of claim 1 in which the electronically conductive material is a thin layer of graphite felt.

9. The device of claim 1 in which the conductive member is a perforated metal sheet.

10. The device of claim 1 in which the solid electrolyte is a tube having one reactant in contact with its interior and the other reactant in contact with its exterior, said conductive material and said conductive member being on the exterior of said tube.

11. The device of claim 10 comprising a plurality of said hollow tubes spaced apart from each other in the container for said second reactant, said conductive material surrounding each of said tubes and connecting with the conductive material surrounding adjacent tubes, said conductive member contacting the entire exterior of said conductive material that is exposed to the second reactant.

12. The device of claim 11 in which the conductive material and the conductive member are in physical and electrical contact with the container for the second reactant.

* * * * *